March 15, 1966 M. R. KUEHNLE 3,240,880

DATA PROCESSING APPARATUS

Filed Feb. 5, 1962 2 Sheets-Sheet 1

MANFRED R. KUEHNLE
INVENTOR.

BY Stanley Belsky
ATTORNEY.

MANFRED R. KUEHNLE
INVENTOR.

BY Stanley Belsky
ATTORNEY.

United States Patent Office 3,240,880

Patented Mar. 15, 1966

3,240,880

DATA PROCESSING APPARATUS

Manfred R. Kuehnle, Lexington, Mass., assignor to Itek Corporation, Lexington, Mass., a corporation of Delaware Filed Feb. 5, 1962, Ser. No. 171,228

1 Claim. (Cl. 179—100.2)

This invention relates generally to data recording and more particularly it is concerned with recorders which make use of a moving magnetic medium.

This application is a continuation-in-part of my copending application Serial No. 81,309 filed January 9, 1961, now abandoned. In that application there is disclosed a recorder wherein the record medium is formed as a helix with a continuous length of thin flexible tape-like material. Because the material is not twisted about its longitudinal axis, the surfaces defining height of the helix is substantially no greater than the combined thicknesses of the bands or strips which go to make up the turns.

Preferably, a head such as that disclosed in the copending application of D. S. Oliver, Serial No. 81,326 filed January 9, 1961 and now abandoned, is used with the record medium. This head is physically quite small and thin, about like the case of a delicate wrist watch. When data is to be recorded on the medium, the head is moved into a position between adjacent turns and the medium is rotated by means of a keyed spindle.

A mounting for the head is provided which permits the head to be moved out of registry with the medium in a direction parallel to its helical axis and then back into registry with a selected turn. In this way, information which has been recorded can be played back selectively notwithstanding the fact that the medium itself is about as physically compact as the tape in a conventional magnetic tape reel. To take full advantage of this miniaturization potential, a special drive mechanism for the spindle and mounting arrangement for the head are provided according to the present invention.

The general object of the present invention, therefore, is to provide an improved design of magnetic recorder of the helical type.

A more specific object is to provide a magnetic recorder that is light-weight and compact enough to be held in the palm of the hand.

Still another object of the invention is to provide a magnetic recorder which is simple to manufacture and to use.

A further object is to provide a magnetic recorder which has substantially fewer parts than conventional magnetic recorders and because none of the parts are delicate or liable to go out of adjustment, is highly reliable in operation.

The novel features of the invention together with further objects and advantages will become apparent from the following detailed description and the drawings to which it refers. In the drawings.

Figure 1:
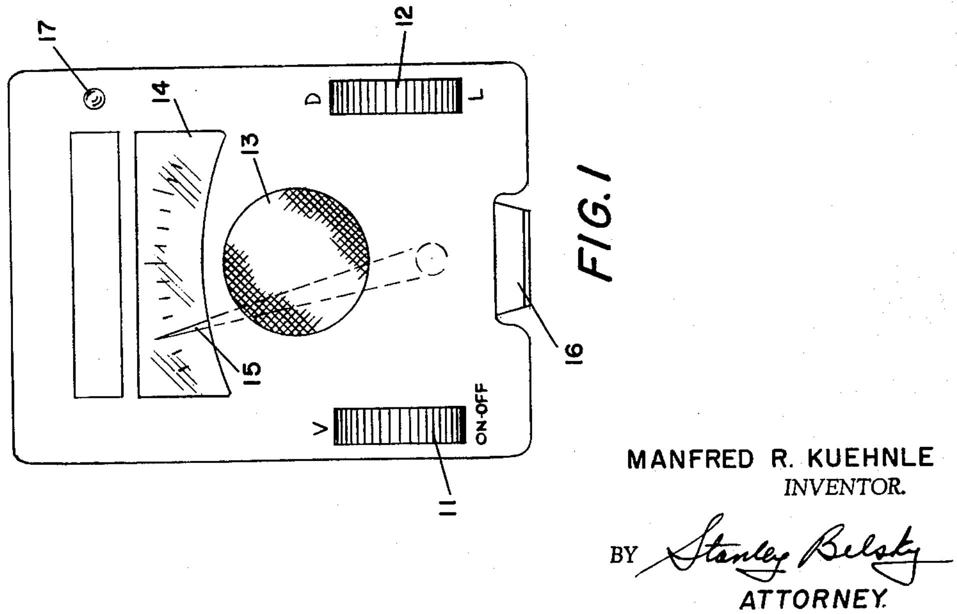
FIGURE 1 is a front view of the case of the recorder in accordance with the present invention.

With reference first to FIG. 1, it will be observed that the case of the magnetic recorder in accordance with the invention is generally rectangular in outline and that a pair of thumb wheels 11 and 12 project from the front of it. Thumb wheel 11 towards the left side of the case turns the recording and playback amplifiers on and off, and also serves to control the gain of the playback amplifier. Thumb wheel 12 towards the right of the case is used to selectively enable the recording and playback amplifiers to operate when it is desired to dictate or alternatively to listen to what has been recorded. In the center of the case, is a loudspeaker opening 13 and above this is a transparent scale 14. A pointer 15 is exposed to view through the scale for the purpose of indicating the position of the recording and playback head relative to the recording track. In other words, the pointer and scale provide an indication of the point on the track then in registry with the head so that specific intelligence that has previously been recorded can be readily located for playback or correction purposes. A control tab 16 projecting from the front of the case is adapted to change the position of the head so that access at random can be had to selected intelligence. Finally, toward the upper right hand corner of the case there is an indicator light 17. Indicator light 17 signifies that the recording and playback amplifiers are on and that the head is disposed in operative relation to the record medium so that information can either be recorded on it or played back from it depending on the position of selector switch 12.

Figure 2:
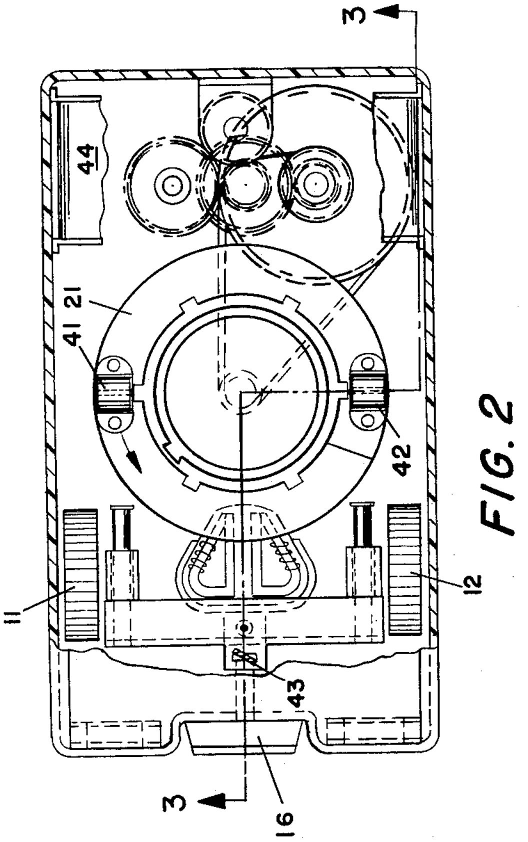
FIGURE 2 is a sectional view of the recorder.
Figure 3:
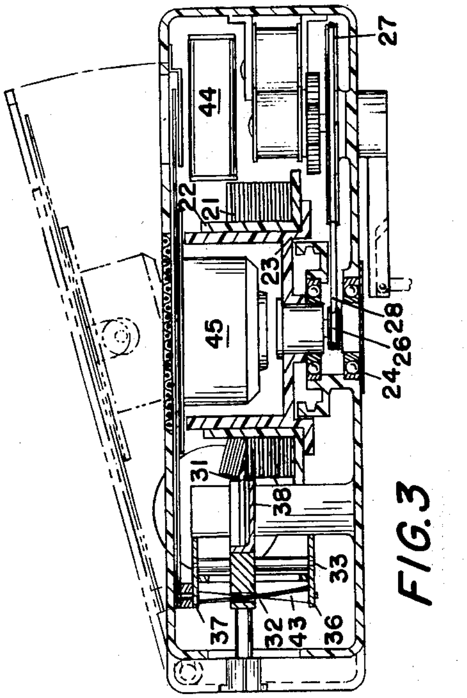
FIGURE 3 is a sectional view taken on line 3—3 of FIGURE 2.

In FIGS. 2 and 3 the internal mechanism of the magnetic recorder of the present invention is shown more in detail. The recording medium itself is designated by the numeral 21 and is seen to be formed as a helix with a continuous length of thin flexible tape-like material. This material is untwisted so that the surfaces thereof defining adjacent turns are adapted to lie closely adjacent to one another. By way of example, the material used for the recording medium may be similar to that which is commonly used in the manufacture of conventional magnetic tape, namely Mylar or acetate base material coated with suitable magnetic oxides and having an overall thickness in the neighborhood of four thousandths of an inch and a width of one half inch. An outside diameter for the helical medium of approximately 2.6 inches will be in keeping with the overall size of the recorder which is shown in full scale in FIGS. 1–3.

Figures 4, 5, 6:
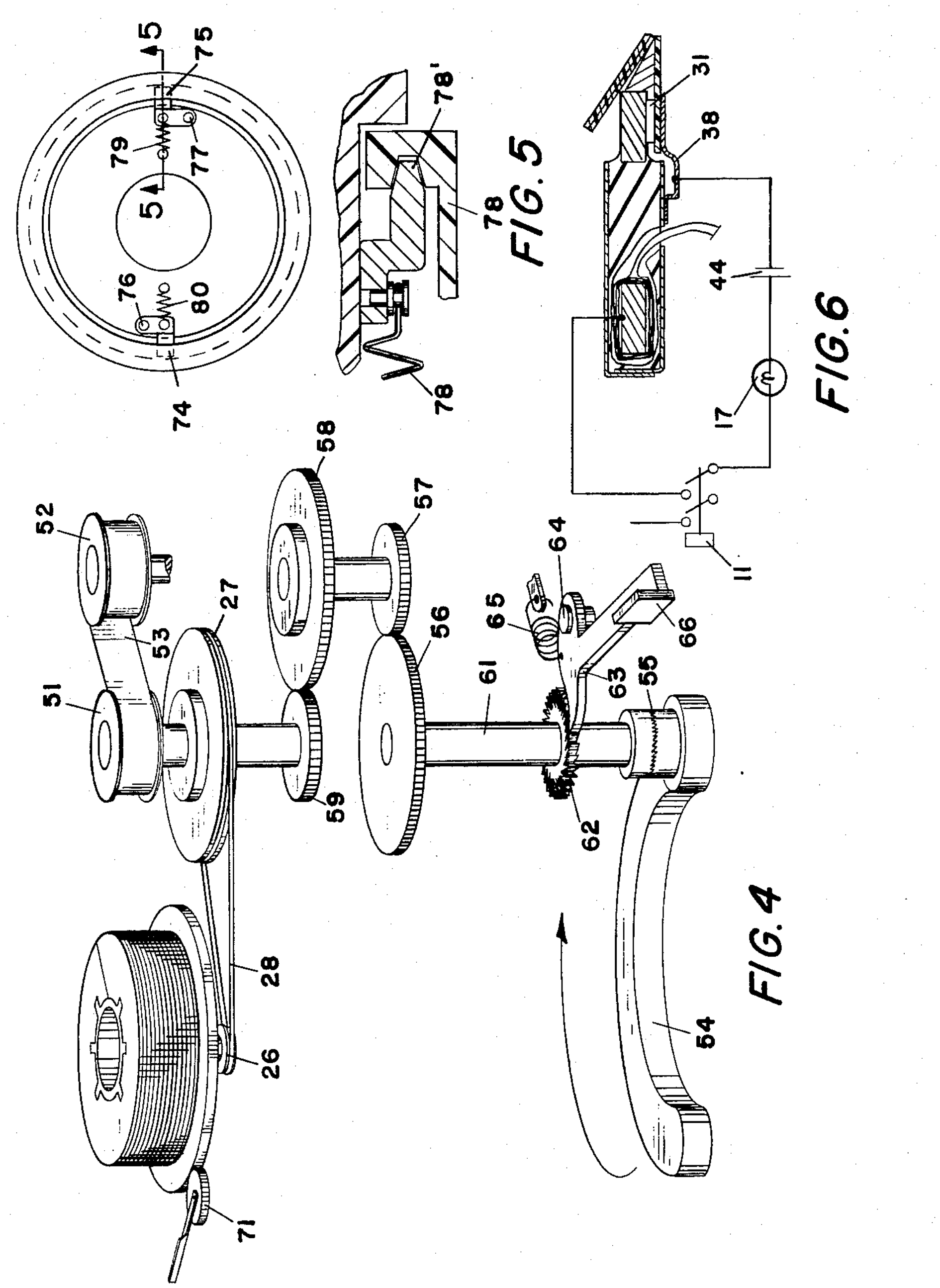
FIGURE 4 is a diagrammatic view of the drive mechanism employed in the recorder.
FIGURE 5 is a detailed view of the centrifugal brake used to control the speed of the recorder.
FIGURE 6 is a sectional view taken on line 6—6 of FIGURE 5, and partial schematic diagram of the indicator lamp circuit.

Recording medium 21 is carried by a spool 22 which is detachable from the recorder proper. Spool 22 is provided with a plurality of keys which interfit with keyways in the helical medium. The keyways are formed with aligned notches in the individual turns. The assembly of the record medium and the carrier spool is mounted on a spindle 23 and the spool and the spindle are keyed to rotate together. Anti-friction bearings 24 support the spindle for rotation by a drive mechanism which include pulleys 26 and 27 interconnected by a belt 28. Pulley 26 is the driven pulley and pulley 27 acts as the drive pulley. The remainder of the drive mechanism will be described more in detail in connection with FIG. 4. Preferably a playback and recording head like the one described in detail in the aforementioned co-pending application of D. S. Oliver, Serial No. 81,326 is employed, which is designated by the numeral 31 in FIGS. 2 and 3 of this application. Head 31 is rigidly fastened to the control tab 16 by an arm 32 which is slidably mounted on a vertical shaft 33. Shaft 33 extends between plates 36 and 37 which form a part of a laterally movable carriage. This mounting arrangement permits the head to be moved up and down while out of registry with the recording medium and laterally, radially, inwardly between individual turns of the medium. As a part of the head assembly there is also provided a resilient pressure pad 38. This pad is shown in more detail in FIG. 6. When the head is out of registry with the recording medium the pressure pad bears against the head. Once, however, as shown in FIG. 6, the head is moved into its operative position between adjacent turns of the medium, the pressure pad is forced away from the head by the turn therebeneath. In other words, the pressure pad serves as a support for the portion of the medium which is then to be recorded upon or played back from. Bearing on the uppermost turn of the helical medium are a pair of fixed rollers 41 and 42. These compact the turns of the helix so as to make it improbable if not impossible for the head and pressure pad to be moved into a position between the same pair of adjacent turns, in other words, without nipping a turn between them.

Also provided as a part of the head assembly is a twist type motion translating element 43 to which the pointer 15 is connected. Twist element 43 rides in a groove in the arm 32 so that its angular position and hence that of the pointer are adapted to reflect the vertical position of the head relative to the recording medium.

Numeral 44 designates a battery for the recording and playback amplifiers, while numeral 45 designates the loudspeaker. Preferably speaker 45 is of the type which is also adapted to serve as a microphone. As shown, it is mounted on a hinged cover which forms a part of case. With the cover closed, the speaker is disposed concentrically within the helical medium. In this way, optimum use is made of the available space inside the recorder.

The drive mechanism for the recording medium is shown more in detail in FIG. 4. From FIG. 4 it will be observed that the source of power for driving the recording medium is a spring motor known as a "Negator" motor. As shown, a motor of this type is comprised of two spools 51, 52 and a ribbon of spring steel 53 which can be wound up almost entirely on one of the spools but will rewind itself automatically onto the other spool whenever the spools are free to turn. In a sense, the ribbon is like a steel tape which tends to coil itself back up after it has been uncoiled. To wind the motor, there is provided a quarter turn lever 54 which is connected to the spool 51 through a jaw clutch 55 and a gear train consisting of spur gears 56–59. Carried by shaft 61 which interconnects the driven clutch member with spur gear 56 is a ratchet wheel 62. Ratchet wheel 62 cooperates with a ratchet member 63 which is pivoted at 64. Normally, the ratchet member is held in engagement with the ratcht wheel teeth by a spring 65. This prevents the motor from operating. When the ratchet member 63 is released, however, by pivoting it away from the ratchet wheel, the motor drives the pulley 27 which in turn produces rotation of the recording medium. To facilitate manual operation of the ratchet member, a thumb tab 66 through the side of the case is rigidly attached to the end of the ratchet member. A thumb wheel 71 is also provided so that Vernier motion of the recording track relative to the head can be accomplished simply and easily. For example, one convenient use for the thumb wheel might be to turn the recording medium in the reverse direction so that a particular recorded word can be located and changed. Thumb wheel 71 is disposed in frictional engagements with the rim of a flanged portion provided at the base of the spindle.

FIGS. 5 and 6 illustarte a centrifugal brake assembly which is provided at the lower end face of the spindle so as to maintain the speed of the recording medium relatively constant. This assembly is seen to include a pair of diametrically spaced brake members 74 and 75 which are adapted to pivot about vertical axes 76 and 77. Under the influence of centrifugal force, the members 74, 75 are caused to pivot radially outwardly so that they press against the walls of a channel 78 formed in a fixed braking disk 78. The greater the centrifugal force, the more positively are brake members 74, 75 caused to press against the channel. This tends to prevent the motor from exceeding a predetermined fixed speed. When the motor is inoperative, so that the spindle 23 is stationary, the brake members are disabled by springs 78, 79 which urge them away from the braking disk. In this regard it should be noted that the inertia of the recording medium remains constant unlike that of a conventional tape spool whose inertia increases as more tape is wound upon it. Because the "Negator" spring motor provides a relatively constant output, this makes it ideally suited for use with applicant's recording medium.

In FIG. 7, the lamp for indicating that the amplifiers are on is shown diagramatically with its energizing circuit. This circuit is seen to include the battery 44 and the actuating switch asociated with thumb wheel 11. The actual conductive path with which the circuit is formed includes the head 31 itself and the pressure pad 38. To complete the circuit, it is necessary for the head and pad to make contact. With the head assembly out of registry with the recording medium and the switch on, the lamp will be lighted. When the head is moved into its operative position with one of the turns nipped between the head and pad, then the light will go out. By this means, a warning is given the operator of the recorder should the head fail to register properly with one of the turns.

Although the invention has been described in connection with a single preferred embodiment, it will be appreciated that many variants of this embodiment that are within the scope of the invention are possible. Therefore, the invention should not be deemed to be limited to the details of what has been described herein by way of illustration but rather it should be deemed to be limited only by the scope of the appended claim.

What is claimed is:

A hand-held portable data recording device having a longest overall dimension, L, wherein L is no greater than seven inches, comprising in combination:

a magnetizable record medium formed as a helix with a continuous length of thin flexible tape-like material which is untwisted so that the surfaces of the matrial defining adjacent turns are adapted to lie closely adjacent to one another;

a rotatable hollow spindle extending axially of said helical magnetizable record medium, said hollow spindle having an inside diameter at least as great as $L/4$;

means for rotating said hollow spindle;

means for mounting said helical magnetizable record medium upon said spindle so that said medium rotates with said spindle;

a microphone having an outside diameter at least as great as three fourths of said inside diameter of said hollow spindle and having a volume which is at least half of the volume of the hollow portion of said hollow spindle;

means for mounting said microphone within said hollow spindle;

a recording head electrically coupled to said microphone, and;

means for mounting said recording head for radial movement from an inoperative position to an operative position between a pair of adjacent turns of said helical recording medium.

References Cited by the Examiner

UNITED STATES PATENTS

| | | | |
|---|---|---|---|
| 2,699,089 | 1/1955 | Jakobs et al. | 179—100.2 |
| 2,903,323 | 9/1959 | Riester et al. | 346—136 |
| 2,975,238 | 3/1961 | Jones | 274—4.1 |
| 2,990,182 | 6/1961 | Cailliot | 274—41.4 |

IRVING L. SRAGOW, *Primary Examiner.*

BERNARD KONICK, *Examiner.*